United States Patent
Chen et al.

(10) Patent No.: US 8,986,399 B2
(45) Date of Patent: Mar. 24, 2015

(54) TREATING LIGNOCELLULOSIC MATERIALS

(75) Inventors: Sung-Wei Chen, Las Vegas, NV (US); Chris Rothfuss, Laramie, WY (US); John Choi, Henderson, NV (US)

(73) Assignee: Empire Technology Development LLC, Wilmington, DE (US)

(*) Notice: Subject to any disclaimer, the term of this patent is extended or adjusted under 35 U.S.C. 154(b) by 177 days.

(21) Appl. No.: 13/319,834

(22) PCT Filed: May 25, 2011

(86) PCT No.: PCT/US2011/037930
§ 371 (c)(1),
(2), (4) Date: Nov. 10, 2011

(87) PCT Pub. No.: WO2012/161708
PCT Pub. Date: Nov. 29, 2012

(65) Prior Publication Data
US 2012/0297555 A1 Nov. 29, 2012

(51) Int. Cl.
*D06M 13/322* (2006.01)
*C08L 97/02* (2006.01)
*C08H 8/00* (2010.01)

(52) U.S. Cl.
CPC .. *C08L 97/02* (2013.01); *C08H 8/00* (2013.01)
USPC .......................... 8/181; 8/116.1; 8/194; 8/196

(58) Field of Classification Search
USPC ............................................................ 8/194
See application file for complete search history.

(56) References Cited

U.S. PATENT DOCUMENTS

| | | | |
|---|---|---|---|
| 755,240 A | 3/1904 | Powell | |
| 3,453,067 A | 7/1969 | Bochove et al. | |
| 4,354,316 A | 10/1982 | Schroeder | |
| 4,952,684 A | 8/1990 | Yalpani et al. | |
| 5,654,271 A * | 8/1997 | Breinholt et al. | 514/3.6 |
| 5,663,150 A | 9/1997 | Matzke et al. | |

(Continued)

FOREIGN PATENT DOCUMENTS

| | | |
|---|---|---|
| AU | 2004202262 | 1/2005 |
| BR | 0401887-7 | 7/2005 |

(Continued)

OTHER PUBLICATIONS

Barazzouk, S. et al., "Spectroscopic characterization of oxidized nanocellulose grafted with fluorescent amino acids," *Cellulose*, Feb. 3, 2011, vol. 18, pp. 643-653.

(Continued)

*Primary Examiner* — Harold Pyon
*Assistant Examiner* — Katie L Hammer
(74) *Attorney, Agent, or Firm* — Foley & Lardner LLP

(57) ABSTRACT

A process of covalently modifying a lignocellulosic material is provided. The process includes oxidizing a lignocellulosic material having hydroxyl groups with an oxidant to oxidize at least a portion of the hydroxyl groups to carboxylic acid groups, optionally activating the carboxylic acid groups with an activating agent to form activated carboxylic acid groups, and reacting the carboxylic acid groups or the activated carboxylic acid groups with a first nitrogen-containing reagent selected from amino acids, peptides, or protected derivatives thereof to provide a treated lignocellulosic material. The treated lignocellulosic materials thus prepared displays resistance to degradation.

6 Claims, 2 Drawing Sheets

(56) References Cited

U.S. PATENT DOCUMENTS

| | | | |
|---|---|---|---|
| 6,830,784 B2 | 12/2004 | Gutowski et al. | |
| 6,919,447 B2 | 7/2005 | Komen et al. | |
| 7,300,705 B2 | 11/2007 | Neogi et al. | |
| 8,088,831 B2 | 1/2012 | Suzuki et al. | |
| 2005/0049182 A1* | 3/2005 | Krieger et al. | 514/8 |
| 2006/0083910 A1 | 4/2006 | Hoglinger et al. | |
| 2007/0122441 A1* | 5/2007 | Murata et al. | 424/405 |
| 2007/0131362 A1 | 6/2007 | Buchert et al. | |
| 2008/0182752 A1 | 7/2008 | Izumori et al. | |
| 2009/0011214 A1 | 1/2009 | Wang | |
| 2010/0113537 A1 | 5/2010 | Nonaka | |
| 2010/0188622 A1 | 7/2010 | Suzuki et al. | |

FOREIGN PATENT DOCUMENTS

| | | |
|---|---|---|
| CN | 101679682 | 3/2010 |
| CN | 101679683 | 3/2010 |
| EP | 1 491 305 | 12/2004 |
| GB | 212301 | 3/1924 |
| KR | 20100034731 | 4/2010 |
| KR | 20100034732 | 4/2010 |
| NZ | 532958 | 6/2005 |
| NZ | 538107 | 10/2005 |
| TW | 200922992 | 6/2009 |
| TW | 200927811 | 7/2009 |
| WO | WO-00/78793 | 12/2000 |
| WO | WO-2009/011228 | 1/2009 |
| WO | WO-2009/011229 | 1/2009 |

OTHER PUBLICATIONS

Bode, J.W. et al., "Chemoselective Amide 0Ligations by Decarboxylative Condensations of N-Alkylhydroxylamines and alpa-Ketoacids," *Angewandte Chemie International Edition*, 2006, vol. 45, No. 8, pp. 1248-1252.

Boman, H.G., "Antibacterial peptides: basic facts and emerging concepts," *Journal of Internal Medicine*, 2003, vol. 254, No. 3, pp. 197-215.

De Lucca, A.J. et al., "Antifungal Peptides: Novel Therapeutic Compounds against Emerging Pathogens," *Antimicrobial Agents and Chemotherapy*, Jan. 1999, vol. 43, No. 1, pp. 1-11.

Elliott, M.L. et al., "The Effect of alpha-Aminoisobutyric Acid on Wood Decay and Wood Spoilage Fungi," *International Biodeterioration*, 1989, vol. 25, No. 5, pp. 355-371 (9 pages).

Harrison, S. et al., "Hybrid Rigid/Soft and Biologic/Synthetic Materials: Polymers Grafted onto Cellulose Microcrystals," *Biomacromolecules*, Mar. 7, 2011, vol. 12, pp. 1214-1223.

Homan, W. et al., "Structural and other properties of modified wood," Proc World Conference on Timber Engineering, Jul. 31-Aug. 3, 2000, Whistler Resort, British Columbia, Canada, printed on Sep. 14, 2011, retrieved from http://timber.ce.wsu.edu/Resources/papers/3-5-1.pdf, 8 pages.

Homan, W.J. et al., "Wood modification developments", *HERON*, 2004, vol. 49, No. 4, pp. 361-386.

International Search Report and Written Opinion for Intl. Pat. Appln. No. PCT/US2011/037930, mailed Jul. 14, 2011, 9 pp.

Jorissen, A. et al., "The influence of acetylation of Radiata pine in structural sizes on its strength properties," Proceedings Second European Conference on Wood Modification, Oct. 8-9, 2005, Gottingen, Germany, pp. 108-116.

Lai, Y-Z et al., "Estimation of Phenolic Hydroxyl Groups in Wood by a Periodate Oxidation Method," *Journal of Wood Chemistry and Technology*, 1990, vol. 10, No. 3, pp. 365-377.

Li, Y.F. et al., "Improvement of Durability of Wood by Maleic Anhydride," *World Academy of Science, Engineering and Technology*, 2010, vol. 65, pp. 86-89.

Mohebby, B. et al., "Influences of the hydro-thermal treatment on physical properties of beech wood (*Fagus orientalis*)," 36th Annual Meeting of the International Research Group on Wood Protection, Section 4, Processes and Properties, Bangalore, India, Apr. 24-28, 2005, 9 pages.

Nozaki, H. et al., "D-Amino acid production by *E. coli* co-expressed three genes encoding hydantoin racemase, D-hydantoinase and N-carbamoyl-D-amino acid amidohydrolase," *Journal of Molecular Catalysis B: Enzymatic*, 2005, available online Jan. 8, 2005, vol. 32, No. 5-6, pp. 213-218.

Park, J.-H. et al., "Production of D-Amino Acid Using Whole Cells of Recombinant *Escherichia coli* with Separately and Coexpressed D-Hydantoinase and N-Carbamoylase," *Biotechnology Progress*, Jun. 2, 2000, vol. 16, No. 4, pp. 564-570.

Rajasekaran, K. et al., "Broad-Spectrum Antimicrobial Activity in vitro of the Synthetic Peptide D4E1," *Journal of Agricultural Food Chemistry*, 2001, published on web May 4, 2001, vol. 49, No. 6, pp. 2799-2803.

Rosenthal, G.A. et al., "Insecticidal Properties of Some Derivatives of L-Canavanine," *Journal of Agricultural Food Chemistry*, 1995, vol. 43, No. 10, pp. 2728-2734.

Rosenthal, G.A., "L-Canavanine: a higher plant insecticidal allelochemical," *Amino Acids*, 2001, vol. 21, pp. 319-330.

Rosenthal, G.A., "The Biological Effects and Mode of Action of L-Canavanine, a Structural Analogue of L-Arginine," *The Quarterly Review of Biology*, Jun. 1977, vol. 52, No. 2, pp. 155-178.

Rowell, R.M., "Chemical Modification of Wood," Chapter 22, *Handbook of Engineering Biopolymers: Homopolymers, Blends, and Composites*, 2007, pp. 673-691.

Schoenfeld, W., "PLD-118: a Cyclopentane Amino Acid with Antifungal Activity," Abstract No. 11 for Interscience Conference on Antimicrobial Agents and Chemotherapy, Dec. 16-19, 2001, Chicago, IL, printed on Oct. 14, 2011, retrieved from http://gateway.nlm.nih.gov/MeetingAbstracts/ma?f=102269742.html, 2 pages.

Teco, "Wood-Based Structural-Use Panels and Formaldehyde Emissions," printed on Sep. 14, 2011, retrieved from http://www.tecotested.com/techtips/pdf/tt_formaldehydeemission, 3 pages.

Yamaki, H. et al., "Mechanism of the Antifungal Action of (S)-2-Amino-4-oxo-5-hydroxypentanoic Acid, RI-331—Inhibition of Homoserine Dehydrogenase in *Saccharomyces cerevisiae*," Synthesis and Chemistry of Agrochemicals III, Sep. 22, 1992, Chapter 39, pp. 428-442.

Ziegelbauer, K. et al., "Molecular Mode of Action of the Antifungal β-Amino Acid BAY 10-8888," *Antimicrobial Agents and Chemotherapy*, Sep. 1998, vol. 42, No. 9, pp. 2197-2205.

Accoya, "Creating the World's Leading High Technology Wood," accessed at http://web.archive.org/web/20101212050823/http://accoya.com/technology.html, accessed on Jan. 3, 2014, 1 page.

Bautista, D.A., et al., "Effect of L-Glucose and T-Tagatose on Bacterial Growth in Media and a Cooked Cured Ham Product," Journal of Food Protection, 2000, vol. 63, No. 1, pp. 71-77.

Cui, W., et al., "Wood products and wood protection in China," European Journal of Wood and Wood Products, 2000, vol. 58, Issue 5, pp. 387-391.

Fiddaman, P.J., et al., "Effect of substrate on the production of antifungal volatiles from Bacillus subtilis," Journal of Applied Microbiology, 1994, vol. 76, No. 4, pp. 395-405.

Findlay, W.P.K., "Effect of addition of sugar on rate of decay of wood," Annals of Applied Biology, 1941, vol. 28, Issue 1, pp. 19-22.

Hatano, a., et al., "Impact of Unnatural Nucleosides on the Control of Microbial Growth," Biocontrol Science, 2009, vol. 14, No. 2, pp. 55-60.

International Search Report and Written Opinion for Intl. Appin. No. PCT/US2012/032487 mailed on May 29, 2012, 8 pages.

Jebrane, M., et al., "A novel simple route to wood acetylation by transesterification with vinyl acetate," Holzforschung, 2007, vol. 61, Issue 2, pp. 143-147.

Jeffries, T.W., et al., "Strain selection, taxonomy, and genetics of xylose-fermenting yeasts," Enzyme and Microbial Technology, Nov. 1994, vol. 16, Issue 11, pp. 922-932.

Jeong, R.U., et al., "Effect of D-allose on prostate cancer cell lines: phospholipid profiling by nanoflow liquid chromatography-tandem mass spectrometry," Anal Bioanal Chem, 2011, vol. 401, No. 2, pp. 689-698.

Rowell, R., "Chemical Modification of Wood to Produce Stable and Durable Composites," Cellulose Chemistry and Technology, 2012, vol. 46, No. 7-8, pp. 443-448.

(56) References Cited

OTHER PUBLICATIONS

Stamm, A.J., "Minimizing Wood Shrinkage and Swelling: Treatment with Sucrose and Invert Sugar," U.S. Department of Agriculture, Forest Service, Forest Products Laboratory, Madison, Wisconsin, Mar. 1955, 7 pages.

Wikipedia, "Hexose," accessed at http://web.archive.org/web/20100731035732/http://en.wikipedia.org/wiki/Hexose, Jul. 28, 2010, pp. 1-6.

Wikipedia, "L-Glucose," accessed at http://web.archive.org/web/20100501012509/http://en.wikipedia.org/wiki/L-Glucose, Apr. 11, 2010, pp. 1-3.

* cited by examiner

US 8,986,399 B2

TREATING LIGNOCELLULOSIC MATERIALS

CROSS-REFERENCE TO RELATED APPLICATION

The present application is a U.S. national stage application under 35 USC §371 claiming the benefit of International Patent Application No. PCT/US2011/037930, filed on May 25, 2011, the entire contents of which is incorporated herein by reference in its entirety.

FIELD

The present technology is generally related to the treatment of lignocellulosic materials.

BACKGROUND

The polymeric structure of lignocellulosic cell walls consists primarily of cellulose, hemicellulose, and lignin. Each of these components possesses hydroxyl functional groups which moderate the interaction of water with the lignocellulosic material. For example, lignocellulosic materials such as wood may swell under moist conditions, in large part due to hydrogen bonding between water and the hydroxyl groups on the cell wall components. Many chemical-based wood treatment methods rely on covalently modifying the hydroxyl groups of cell walls, to improve a variety of wood properties such as hardness, dimensional stability, resistance to UV light, and resistance to decay. For example, in acetylation, hydroxyl groups are reacted with acetic anhydride to incorporate acetyl groups on to the cell walls of the wood. Both through reduction of free hydroxyl functionality and through incorporation of less polar groups, the acetylated wood exhibits a marked decrease in its ability to absorb water. Incorporation of large acetyl groups also serves to bulk the cell walls of the material, further blocking water absorption pathways. As a result, in comparison to untreated wood, acetylated wood demonstrates much better ability to resist attack by wood-decaying organisms such as brown, white, and soft rot fungi.

Despite the aforementioned advantages of acetylation as a wood preservation technique, the method suffers from drawbacks. In particular, acetylation requires the use of a difficult-to-handle chemical reagent (acetic anhydride) which produces a stench byproduct (acetic acid) that must either be recycled or disposed. Furthermore, since acetylation processes are typically tailored to chemically modify most or all of the hydroxyl functionality of wood, large volumes of acetic anhydride are necessary.

SUMMARY

In accordance with one aspect, a process of preparing a treated lignocellulosic material is provided, the process including oxidizing a lignocellulosic material having hydroxyl groups with an oxidant to oxidize at least a portion of the hydroxyl groups to carboxylic acid groups, optionally activating the carboxylic acid groups with an activating agent to form activated carboxylic acid groups, and reacting the carboxylic acid groups or the activated carboxylic acid groups with a first nitrogen-containing reagent selected from amino acids, peptides, or protected derivatives thereof to provide the treated lignocellulosic material. In some embodiments, the lignocellulosic material is wood. In some embodiments, the amino acid, the peptide, or protected derivative thereof is a biocidal agent, such as a pesticide, a microbicide, a fungicide, an herbicide, an insecticide, an algicide, a rodenticide, and the like. In some embodiments, biocidal agent imparts similar biocidal activity to the treated lignocellulosic material; thus the treated lignocellulosic material is a pesticide, a microbicide, a fungicide, an herbicide, an insecticide, an algicide, a rodenticide, and the like.

In another aspect, a treated lignocellulosic material is provided according to a process including oxidizing a lignocellulosic material having hydroxyl groups with an oxidant to oxidize at least a portion of the hydroxyl groups to carboxylic acid groups, optionally activating the carboxylic acid groups with an activating agent to form activated carboxylic acid groups, and reacting the carboxylic acid groups or the activated carboxylic acid groups with a first nitrogen-containing reagent selected from the group consisting of amino acids, peptides, or protected derivatives thereof to provide the treated lignocellulosic material.

In another aspect, a method of inhibiting fungal growth on a lignocellulosic material is described, the method including oxidizing a lignocellulosic material having hydroxyl groups with an oxidant to oxidize at least a portion of the hydroxyl groups to carboxylic acid groups, optionally activating the carboxylic acid groups with an activating agent to form activated carboxylic acid groups, and reacting the carboxylic acid groups or the activated carboxylic acid groups with a first nitrogen-containing reagent selected from the group consisting of amino acids, peptides, or protected derivatives thereof to provide a treated lignocellulosic material. In some embodiments, fungal growth is prevented.

In a further aspect, a composition is provided which includes an amide-bound amino acid or an amide-bound peptide on a surface of a lignocellulosic material where the composition is a biocidal agent. In some embodiments, the amide-bound amino acid is (S)-canavanine.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
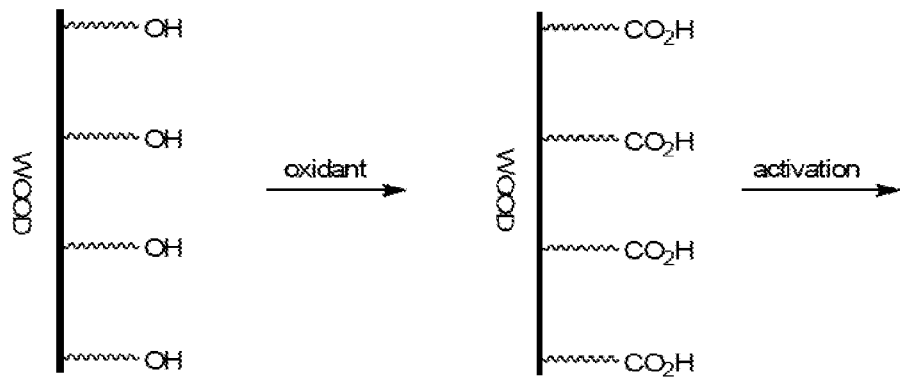
FIG. 1 is a general illustration of a lignocellulosic treatment process, according to one embodiment.
Figure 1:
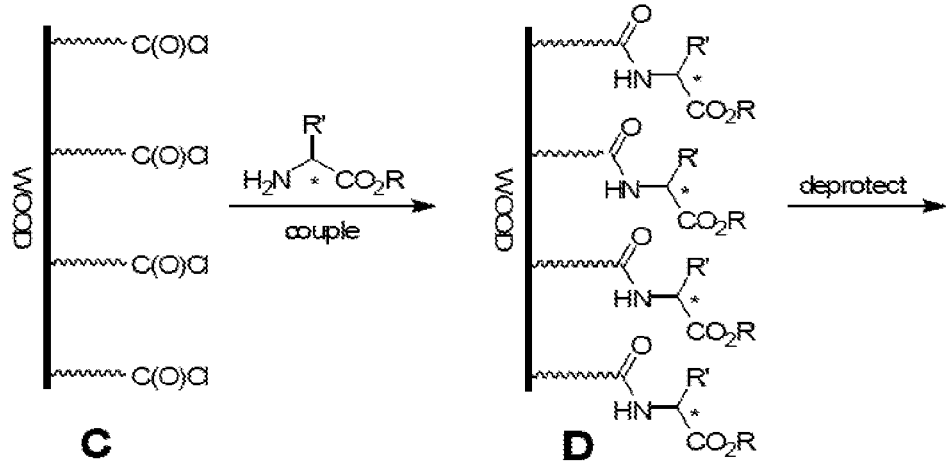
Figure 1:
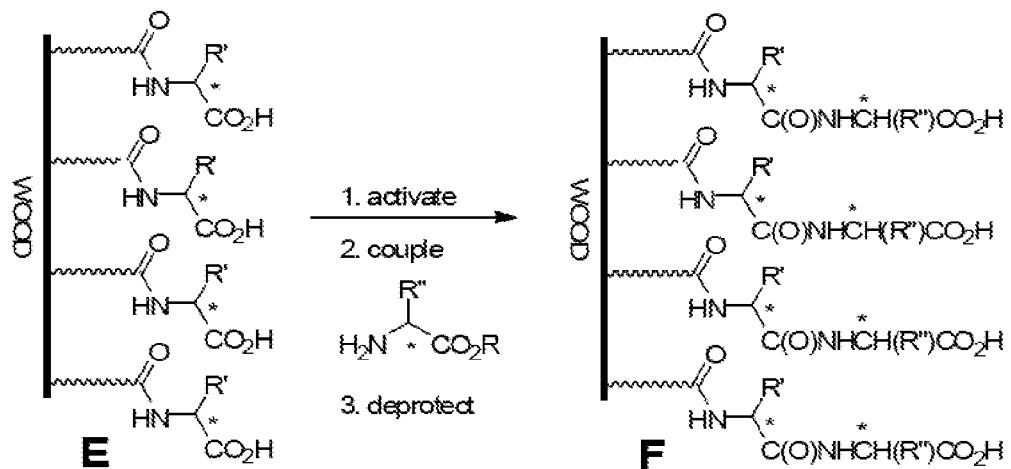

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Processes for preparing treated lignocellulosic materials, treated lignocellulosic materials themselves, and methods of inhibiting decay or decomposition of lignocellulosic materials are provided. In particular, a variety of avenues are presented for covalent modification of lignocellulosic materials with amino acids, peptides or combinations thereof. The amino acids, and/or peptides, are covalently bound via the N-terminus to the lignocellulosic material through amide bonds. Such a modification may serve to protect the lignocellulosic material from degradation by a variety of mechanisms. For example wood may be covalently modified to include amino acids or peptides which are not readily metabolized by wood-degrading microorganisms, thus making the wood resistant to decay. Alternatively, wood may be covalently modified to contain amino acids or peptides which display biological activity against wood-degrading microorganisms. In this regard, the amino acids or peptides behave as a microbicide. Alternatively, the biologically-active amino acids or peptides may behave as a pesticide, a fungicide, an herbicide, an insecticide, an algicide, a rodenticide, and the like. Furthermore, such biological activity may be imparted to the treated lignocellulosic material. Combinations of amino acids and/or peptides with varying wood-protecting properties may be employed.

Typically, any lignocellulosic material may be used, providing such lignocellulosic material has hydroxyl groups which can be chemically modified. Indeed, all lignocellulosic materials have hydroxyl groups as part of their cell walls in the form of cellulose, hemicellulose, and lignin. Cellulose is a polysaccharide comprised of hundreds to thousands of linked D-glucose units, with each glucose residue possessing three hydroxyl groups. Similarly, hemicellulose contains hydroxyl groups which may be modified. Lignin is a complex polymer derived from a phenylpropane repeating unit and contains numerous hydroxyl groups, both phenolic and non-phenolic. Phenolic hydroxyl groups are hydroxyl groups which are attached to an aromatic ring, such as found in phenol or β-naphthol. Thus, there are generally ample hydroxyl groups susceptible to oxidation, regardless of the nature of the lignocellulosic material.

Lignocellulosic materials may be woody materials or non-woody materials. In the case of woody materials, the lignocellulosic material may be a softwood or a hardwood. Hardwoods and softwoods originate from a variety of tree species, including, but not limited to: oak, pine, fir (such as Douglas fir), pecan, ash, beech, birch, maple, walnut, teak, redwood, and the like. Non-woody plant materials such as cereal straw, bagasse, bamboo, reeds, cotton, or grass plants such as flax, kenaf, jute, hemp, sisal, abaca, and the like may also be employed. Indeed, the short growth cycles and moderate irrigation requirements make non-woody lignocellulosic attractive renewable resources for modification. Furthermore, mixtures of lignocellulosic materials may be used.

The physical form of the lignocellulosic material is generally inconsequential and the selection of a given form depends simply on the downstream application of the treated lignocellulosic material. In the case of wood-derived lignocellulosic materials, the wood may be in the form of lumber (typically solid planks, boards, sheets, and the like), wood fiber, wood particles, wood chips, ground wood, wood flour, wood flakes, wood veneers, wood laminates, saw dust and the like.

The process includes oxidizing at least a portion of the hydroxyl groups of the lignocellulosic material with an oxidant to carboxylic acid groups. In some embodiments, the hydroxyl groups which are oxidized by the oxidant are on, or are in, the cell walls of the lignocellulosic material. Hydroxyl groups of cellulose, hemicellulose, or lignin may be oxidized. In other embodiments, the hydroxyl groups which are oxidized are phenolic hydroxyl groups, such as those found in lignin. In other embodiments, oxidation of hydroxyl groups occurs at the surface of the lignocellulosic material, such as at the surface of a wooden board. There is no requirement that all of the hydroxyl groups in the lignocellulosic material be oxidized to carboxylic acid groups. It may well be the case that some hydroxyl groups, such as phenolic hydroxyl groups, are refractory towards oxidation, especially if a mild oxidant is employed. Furthermore, it may be desirable to oxidize only a portion of the hydroxyl groups of the lignocellulosic material in certain instances. For example, if a lignocellulosic material possessing hydroxyl groups is only partially oxidized, then both carboxylic acid and hydroxyl groups (i.e., unreacted hydroxyl groups) will be present. Thus, it would be possible to acetylate the hydroxyl groups and use the carboxylic acid groups for further modification as presented herein. In some embodiments, about 0.5% to about 100% of the hydroxyl groups are oxidized to carboxylic acid groups. In other embodiments, about 2% to about 70% of the hydroxyl groups are oxidized to carboxylic acid groups.

The oxidation of hydroxyl groups to carboxylic acid groups may be accomplished by any number of oxidants known to those of skill in the art. The only requirement of the oxidant is that it possess sufficient oxidizing strength to oxidize a portion of the hydroxyl groups of the lignocellulosic material to carboxylic acid groups. For commercial scale processes, inexpensive oxidants which are available in tonnage quantities may be desired. The oxidants may be stoichiometric (e.g., bleach) or a catalytic (e.g., 2,2,6,6-tetramethylpiperidin-1-yl)oxyl, "TEMPO") in nature. Multiple oxidants may be used in combination.

The oxidant may include a diatomic halogen of formula $X_2$, where X is a halogen. Thus, halogen oxidants include $F_2$, $Cl_2$, $Br_2$, $I_2$, and the like. The oxidant may include a hypohalite of formula $XO^-$, where X is a halogen in a +1 oxidation state. Hypohalites include metal hypohalite salts such as sodium hypochlorite and potassium hypobromite. As used herein, the term "metal" not only includes alkali metals (e.g., Li, Na, K, Cs, etc.), but also alkaline earths (e.g., Mg, Sr, Ca, etc.) and transition metals (e.g., Cr, Mn, Fe, Co, Ni, Cu, Zn, Ru, Rh, Pd, Ag, Re, etc). The oxidant may include a halite of formula $XO_2^-$, where X is a halogen in a +3 oxidation state. Halites include metal halite salts such as sodium chlorite and potassium bromite. The oxidant may include a halate of formula $XO_3^-$, where X is a halogen in a +5 oxidation state. Halates include metal halate salts such as sodium chlorate and potassium bromate. The oxidant may include a perhalate of formula $XO_4^-$, where X is a halogen in a +7 oxidation state. Perhalates include metal perhalate salts such as sodium perchlorate, sodium periodate, and potassium perbromate. The oxidant may include a hypohalous acid (e.g., HOCl, HOBr, or HOI), a halous acid (e.g., $HClO_2$, $HBrO_2$, or $HIO_2$), a halic acid (e.g., $HClO_3$, $HBrO_3$, or $HIO_3$), or a perhalic acid (e.g., $HClO_4$, $HBrO_4$, or $HIO_4$). The oxidant may include a chromate such as a metal chromate salt (e.g., $K_2CrO_4$ and the like), a dichromate such as a metal chromate salt (e.g., $K_2Cr_2O_7$ and the like), chromic acid ($H_2CrO_4$), a permanganate such as a metal permanganate salt (e.g., $KMnO_4$ and the like), an oxide such as a metal oxide (e.g., $Ag_2O$, $OsO_4$, $RuO_4$, TPAP, and the like), a peroxide such as a metal peroxide salt (e.g., $Li_2O_2$ and the like), a superoxide such as a metal superoxide salt (e.g., $NaO_2$ and the like), hydrogen peroxide ($H_2O_2$), an oxygen-containing gas (e.g., oxygen, air, ozone, chlorine dioxide, nitrogen dioxide, and the like), a nitrate such as metal nitrate salt (e.g., $KNO_3$ and the like), nitric acid ($HNO_3$), and nitrobenzene ($C_6H_5NO_2$). The oxidant may also be an organic oxidant, such as an organic nitroxide or an organic oxoammonium salt. Organic nitroxides are free radical species of the general formula $R_1R_2NO$ where $R_1$ and $R_2$ are independently selected from substituted or unsubstituted alkyl, alkenyl, and aryl groups. $R_1$ and $R_2$ may further be taken together to form a heterocyclic, N-containing ring. Examples of heterocyclic nitroxides include TEMPO, 4-hydroxy-TEMPO, 4-acetamido-TEMPO, 4-oxo-TEMPO, and the like. Similarly, oxoammonium salts may be employed as the oxidant. N-Oxoammonium salts have the general formula $[R_1R_2NO]^+ Y^-$, where $R_1$ and $R_2$ are defined as above and Y is a stabilizing anion. An example of a heterocyclic oxoammonium salt is 4-acetamido-2,2,6,6-tetramethylpiperidine oxoammonium tetrafluoroborate. Any of the above oxidants may be used in combination with each other when oxidizing the hydroxyl groups of the lignocellulosic material.

The process optionally includes activating the carboxylic acid groups with an activating agent to form activated carboxylic acid groups. As used herein, the term "activated carboxylic acid groups" refers to derivatives of carboxylic acid groups which are more reactive towards nucleophilic acyl substitution than carboxylic acid groups. Activated carboxylic acid groups have a formula of —C(O)Z, where Z is a leaving group. In some embodiments, the activated carboxylic acid groups are acid halides (i.e., Z is a halogen). Acid halides include acid fluorides, acid chlorides, acid bromides, and the like. The activated carboxylic acid groups may be ester groups, where Z has the formula of —OR, where R is a $C_1$-$C_{10}$ alkyl, $C_1$-$C_{10}$ alkenyl, $C_1$-$C_{10}$ alkynyl, $C_3$-$C_6$ aryl, or a substituted derivative thereof. In some embodiments, the activated carboxylic acid groups are alkyl esters or aryl esters. In some embodiments, the activated carboxylic acid groups are methyl esters, ethyl esters, tert-butyl esters, and the like. While it may be possible to isolate the lignocellulosic material possessing such activated carboxylic acid groups, there may be instances where it is neither desirable nor possible to isolate the lignocellulosic material having such groups. For example, acid halides are generally understood by those of skill in the art be highly reactive, particularly towards adventitious moisture. Thus, if the lignocellulosic material includes activated carboxylic acid groups which are acid halide groups, it may be desirable to use the acid halide-functionalized lignocellulosic material directly in a subsequent reaction, without any substantial purification and/or isolation. Furthermore, the activated carboxylic acid groups may be so reactive as to preclude the possibility of isolating the lignocellulosic material which possesses such reactive groups. As will be appreciated by those of the skill in the art, many of the activating agents in the following paragraph generate activated carboxylic acid species which are used in situ (e.g., intermediates generated upon the reaction of a carboxylic acid with a carbodiimide, a guandinium salt, a uronium salt, etc).

A variety of activating agents may be employed to prepare activated carboxylic acid groups. In some embodiments, the activating agent includes, a chlorinating reagent, a brominating reagent, a fluorinating reagent, a carbodiimide, an alcohol, an amine, a pyridine, an N-hydroxy reagent, an uronium salt, a guandinium salt, a phosphonium salt, a phosphorus reagent or mixtures thereof. The activating agent may include N-hydroxysuccinimide, DMAP (4-dimethylaminopyridine), pentafluorophenylphenol, N-hydroxyphthalimide, phosgene, thionyl chloride, cyanuric chloride, phosphoryl chloride, phosphorus trichloride, phosphorus pentachloride, CDMT (2-chloro-4,6-dimethoxy-1,3,5-triazine), BTC (bis(trichloromethyl) carbonate), oxalyl chloride, phosphorus tribromide, phosphorus pentabromide, cyanuric fluoride, TFFH (tetramethylfluoroformamidinium hexafluorophosphate), BTFFH (bis(tetramethylene) fluoroformamidinium hexafluorophosphate), DFIH (2-fluoro-1,3-dimethylimidazolium hexafluorophoshpate, DAST ((dimethylamino)sulfur trifluoride), EDC N-(3-dimethylaminopropyl)-N'-ethylcarbodiimide or the hydrochloride salt thereof), DCC(N,N'-dicyclohexylcarbodiimide), DIC(N,N'-diisopropylcarbodiimide), CIC (cyclohexyl isopropyl carbodiimide), BMC (tert-butyl methyl carbodiimide), BEC (tert-butyl ethyl carbodiimide), BDDC (bis((4-(2,2-dimethyl-1,3-dioxolyl)) methyl carbodiimide), N,N-dicyclopentylcarbodiimide, HOAT (1-hydroxy-7-azabenzotriazole), HOBT (1-hydroxybenzotriazole), Cl-HOBT (1-hydroxy-6-chlorobenzotriazole), HODhbt (3-hydroxy-1,2,3-benzotriazin-4(3H)-one), HOCt, PTF (benzyltriphenylphosphonium dihydrogen trifluoride), HATU (N-[(dimethylamino)-1H-1,2,3-triazolo-[4,5-b]pyridin-1-yl-methylene]-N-methylmethanaminium hexafluorophosphate N-oxide), HBTU (O-(benzotriazol-1-yl)-N,N,N',N'-tetramethyluronium hexafluorophosphate), TBTU (O-(benzotriazol-1-yl)-N,N,N',N'-tetramethyluronium tetrafluoroborate), COMU ((1-cyano-2-ethoxy-2-oxo-ethylidenaminooxy)dimethylamino-morpholino-carbenium hexafluorophosphate), Oxyma (ethyl cyano(hydroxyimino) acetate), HCTU ((2-(6-chloro-1H-benzotriazole-1-yl)-1,1,3,3-tetramethylaminium hexafluorophosphate)), TSTU (N,N, N',N'-tetramethyl-O—(N-succinimidyl)uronium tetrafluoroborate), TNTU (O-(5-norbornene-2,3-dicarboximido)-N,N,N',N'-tetramethyluronium tetrafluoroborate), HAMDU (O-(7-azabenzotriazol-1-yl)-1,3-dimethyleneuronium hexafluorophosphate), HAPyU (1-(1-pyrrolidinyl-1H-1,2,3-triazolo[4,5-b]pyridin-1-ylmethylene) pyrrolidinium hexafluorophosphate N-oxide), HDTU (2-(3,4-dihydro-4-oxo-1,2,3-benzotriazin-3-yl)-1,1,3,3-tetramethyluronium hexafluorophosphate), CloP (chlorotris(dimethylamino) phosphonium hexafluorophosphate), BroP (bromotris(dimethylamino)phosphonium hexafluorophosphate), BOP (benzotriazol-1-yloxytris(dimethyl-amino)phosphonium hexafluorophosphate), AOP ((7-azabenzotriazol-1-yl)oxytris-(dimethylamino)phosphonium hexafluorophosphate), PyCloP (chlorotri(pyrrolidino)phosphonium hexafluorophosphate), PyBroP (bromotri(pyrrolidino)phosphonium hexafluorophosphate), PyBOP (benzotriazol-1-yloxytri(pyrrolidino)phosphonium hexafluorophosphate), PyAOP ([(7-azabenzotriazol-1-yl)oxy]tris(pyrrolidino)phosphonium hexafluorophosphate), DPPA (diphenylphosphoryl azide), MPTA (dimethylphosphinothioyl azide), DECP (diethylcyanophosphonate), BBC (benzotriazolyloxybis(pyrrolidino) carbonium hexafluorophosphate), BOP-Cl (N,N-bis(2-oxo-3-oxazolidinyl)phosphinic chloride), and the like.

According to another aspect, the process further includes reacting the carboxylic acid groups or the activated carboxylic acid groups of the lignocellulosic material with a first nitrogen-containing reagent selected from the group consisting of amino acids, peptides, or protected derivatives thereof to provide the treated lignocellulosic material. As used herein, the phrase "protected derivatives" means that the amino functional groups and/or the carboxylic acid functional groups of the amino acids or peptides are protected with protecting groups commonly known in the art. Non-limiting examples of protecting groups for amino groups include, Cbz (carbobenzyloxy), Phth (phthalimide), Fmoc (9-fluorenylmethyloxycarbonyl), Boc (tert-butoxycarbonyl), Tr (trityl), Bn (benzyl), Bz (benzoyl), Ts (tosyl), Ac (acetyl), PMB (p-methoxybenzyl), DMPM (dimethoxybenzyl), PMP (p-methoxyphenyl), Nosyl (nitrobenzenesulfonyl), Nps (nitrophenylsulfenyl), and trifluoroacetyl groups. Carboxylic acids are commonly protected as esters such as alkyl esters (e.g., methyl, ethyl, tert-butyl, and benzyl esters, etc.) or orthoesters. The amino acid (or peptide) may be protected at both the amino group and the carboxylic acid group. Of course, such protecting groups should not prevent reaction between the carboxylic acid groups or activated carboxylic acid groups with the first nitrogen-containing reagent.

As will be readily appreciated by those of skill in the art, reaction of the first nitrogen-containing reagent with the carboxylic acid groups or the activated carboxylic acid groups of the lignocellulosic material will cause the first nitrogen-containing reagent to be covalently bound to the lignocellulosic material through an amide bond (i.e., the reaction is an amidation reaction). More specifically, the N-terminus of the amino acid, peptide, or protected derivative thereof will be covalently bound to the lignocellulosic material via an amide bond. Thus, in one aspect a process for the covalent modification of lignocellulosic materials possessing carboxylic acid groups or activated carboxylic acid groups.

The first nitrogen-containing reagent can include amino acids, peptides or protected derivatives thereof. In some embodiments, the first nitrogen-containing reagent includes α-amino acids, β-amino acids, γ-amino acids, δ-amino acids, or protected derivatives thereof, or mixtures thereof. In other embodiments, the first nitrogen-containing reagent includes proteinogenic amino acids, non-proteinogenic amino acids, protected derivatives thereof, or mixtures thereof. As used herein, the phrase "proteinogenic amino acids" refers to those amino acids that can be found in proteins and requires the cellular machinery associated with the genetic code for their isolated production. Thus, the phrase "proteinogenic amino acids" includes, but is not limited to, glycine and the L-isomers of the 20 amino acids that are directly encoded for protein synthesis by the standard genetic code: arginine, histidine, lysine, aspartic acid, glutamic acid, serine, threonine, asparagine, glutamine, cysteine, proline, alanine, isoleucine, leucine, methionine, phenylalanine, tryptophan, tyrosine, and valine. The term further includes selenocysteine and pyrrolysine. As used herein, the term "non-proteinogenic amino acid" refers to amino acids which are not proteinogenic amino acids. Non-proteinogenic amino acids include those amino acids which are either not found in proteins or are not produced directly and in isolation by standard cellular machinery. For example, carnitine, GABA (γ-aminobutyric acid), L-DOPA (L-3,4-dihydroxyphenylalanine), hydroxyproline, homoserine, and selenomethionine, are non-proteinogenic amino acids. The phrase "non-proteinogenic amino acids" further includes unnatural stereoisomers of proteinogenic amino acids. In other embodiments, the first nitrogen-containing reagent includes D-amino acids, L-amino acids, protected derivatives thereof, or mixtures thereof. In other embodiments, the first nitrogen-containing reagent includes amino acids or protected derivatives thereof, and the amino acids or protected derivatives are a racemic mixture. In an illustrative embodiment, the first nitrogen-containing reagent includes (S)-canavanine or a protected derivative thereof.

The first nitrogen-containing reagent may also be a peptide of the aforementioned amino acids or amino acid derivatives. As used herein, the term "peptides" includes dipeptides, tripeptides, polypeptides and protected derivatives thereof. For example, the first nitrogen-containing reagent may be a tripeptide of the amino acid L-tryptophan. In some embodiments, the dipeptide, the tripeptide, the polypeptide, or the protected derivative thereof has a molecular weight of about 100 g/mol to about 10,000 g/mol or has a molecular weight of about 130 g/mol to about 2,500 g/mol.

According to another aspect, the process may optionally include a deprotecting step after the reacting step. Such a step may be desired to remove protecting groups after protected amino acids, protected peptides, or protected derivatives thereof have been covalently attached to the lignocellulosic material. In this regard, it is also possible to perform peptide synthesis on or in a lignocellulosic material in an iterative fashion. For example, wood which has been covalently modified to contain methyl glycinate residues bound through the N-terminus of methyl glycinate may be treated with aqueous acid to deprotect the methyl ester groups and liberate carboxylic acid groups. The carboxylic acid groups of the amide-bound glycine residue may be reacted with a second nitrogen-containing reagent selected from the group consisting of amino acids, peptides, or protected derivatives thereof.

The selection of a given first nitrogen-containing reagent will depend on the desired application of the treated lignocellulosic material. For example, non-polar amino acids such as alanine, valine, or phenylalanine may be covalently bound to a wood surface to impart water resistance (e.g., lumber for building materials) or to increase compatibility of the surface with a polymeric coating. As previously indicated, the amino acid, peptide, or protected derivative thereof may display biological activity against microbes, fungi, rodents, plants, and insects, thereby protecting the lignocellulosic material from degradation. For example, the non-proteinogenic α-amino acid (S)-canavanine displays strong insecticidal properties which may be imparted to a lignocellulosic material through covalent attachment. Alternatively, the amino acids, peptides, or protected derivatives may be tailored as to not be readily metabolized by any of these organisms, thus also protecting the lignocellulosic material from degradation or decay.

Acetylation processes used to chemically modify lignocellulosic materials are fully compatible with the present processes. For example, the lignocellulosic material possessing hydroxyl groups may be partially acetylated, such that there remains non-acetylated hydroxyl groups for modification. Alternatively, the lignocellulosic material possessing hydroxyl groups may be subjected to oxidizing conditions where only a portion of the hydroxyl groups are oxidized to carboxylic acid groups which are further modified in the manner described. In such a case, the treated lignocellulosic material may possess "unreacted" hydroxyl groups which may be acetylated.

Thus, in some embodiments, the lignocellulosic material possessing hydroxyl groups also possesses acylated hydroxyl groups. In some embodiments the acylated hydroxyl groups are acetylated hydroxyl groups. In some embodiments, the process described further includes an acylation step. In some embodiments, the acylation step is an acetylating step. In some embodiments, the acetylating step is performed by reaction of either a lignocellulosic material possessing hydroxyl groups or a treated lignocellulosic material possessing hydroxyl groups with acetic anhydride.

As will be appreciated by those skilled in the art, any of the oxidizing, activating, or reacting steps of the present process described herein may include a solvent or combinations of solvents. For example, the oxidation of a lignocellulosic material possessing hydroxyl group may be performed in the presence of a solvent which is compatible with the oxidant. Solvents or combinations thereof may also be used to wash the lignocellulosic material after completion of any or all of the oxidizing, activating, or reacting steps. Additional heating or drying steps may also be employed before, or after any of the steps of the processes described herein. The additional heating or drying steps may be performed at or below atmospheric pressure. For example, where a step involves the use of a moisture sensitive reagent, it would be advantageous to dry the lignocellulosic material, potentially with heating, prior to contacting it with the moisture sensitive reagent, as to not reduce the effectiveness of the reagent (e.g., it would be desirable to dry a lignocellulosic material including carboxylic acid groups prior to exposing such lignocellulosic material to a moisture sensitive activating reagent such as thionyl chloride in the activating step). Similarly, any of the steps of the present process may further include heating at a temperature, and for a time period, sufficient to cause oxidation, activation, or reaction in the oxidizing, activating, or reacting steps.

In another aspect, the process detailed herein provides a method for inhibiting fungal growth on a lignocellulosic material, the method including oxidizing a lignocellulosic material having hydroxyl groups with an oxidant to oxidize at least a portion of the hydroxyl groups to carboxylic acid groups, optionally activating the carboxylic acid groups with an activating agent to form activated carboxylic acid groups and reacting the carboxylic acid groups or the activated carboxylic acid groups with a first nitrogen-containing reagent selected from the group consisting of amino acids, peptides, or protected derivatives thereof to provide a treated lignocellulosic material. In some embodiments, the fungal growth on the treated lignocellulosic material is reduced by about 10% to about 100% in comparison to an untreated lignocellulosic material. As used herein, the phrase "untreated lignocellulosic material" means the same lignocellulosic material including hydroxyl groups which has not been subjected to the steps of the present process or method. Reduction in fungal growth on a treated lignocellulosic material in comparison to an untreated lignocellulosic material may be measured over a time period of about one day, about one week, about one month, about 3-6 months, about one year, or about 1-5 years. In some embodiments, fungal growth is prevented. In this regard, fungal growth may be prevented for at least one month, one year, five years, or longer than five years.

The present technology, thus generally described, will be understood more readily by reference to the following examples, which is provided by way of illustration and is not intended to be limiting of the present technology.

EXAMPLES

Example 1

Covalent Modification of a Wood Surface with Amino Acids or Peptides

FIG. 1 is a general illustration of a covalent modification process. In particular, FIG. 1A illustrates a wood substrate including hydroxyl groups on a surface. Oxidation of the hydroxyl groups provides a wood material including carboxylic acid groups on the surface (FIG. 1B). The carboxylic acid groups are activated to acid chloride groups (FIG. 1C). Reaction of the acid chloride groups with a protected and non-racemic amino acid derivative (e.g., an ester of an α-amino acid) provides wood covalently modified with a protected and non-racemic amino acid derivative (i.e., an amino ester), where the derivative is covalently bound to the wood material through amide bonds (FIG. 1D). The ester protecting groups on the amino ester residues are deprotected (such as through hydrolysis) to provide non-racemic amino acid modified wood (FIG. 1E). The treated wood material may be further modified through additional activation, coupling, and deprotection sequences to provide a wood material which includes peptide residues at the surface, as shown in FIG. 1F (i.e., a dipeptide of an α-amino acid). In this example, it is also possible to prepare the amino acid-functionalized wood illustrated in FIG. 1E by direct reaction of the wood shown in FIG. 1C with an unprotected amino acid (process not shown). Likewise, it is also possible to prepare the peptide-functionalized wood shown in FIG. 1F by coupling a dipeptide or protected derivative with the wood indicated in FIG. 1C (process not shown).

Example 2

Covalent Modification of a Wood Surface with (S)-Canavanine

A. Wood Oxidation. The oxidation of wood may be performed in a modification to that described in U.S. Pat. No. 6,919,447, which employs 2,2,6,6-tetramethylpiperidine to form the primary oxidation catalyst. An aqueous solution of $ClO_2$ (7.1 g/L) is prepared. This solution (~5 mL) is reacted with 2,2,6,6-tetramethylpiperidine (~80 mg) to form the corresponding oxoammonium salt as a catalyst solution. Separately, a cube (1 in$^3$) of a Douglass fir is added to a solution containing aqueous $ClO_2$ (7.1 g/L, 85-90 mL), $NaHCO_3$ (3 g), and aqueous $H_2O_2$ (3.3%, 0.08 g). The catalyst solution is then added to solution containing the wood cube and the whole is contained in a sealed polyethylene bag. The polyethylene bag is immersed in a 70° C. water bath for at least 5-60 min. The pH is then adjusted below 3 with 1M $H_2SO_4$. Aqueous $H_2O_2$ (3.3%, 3 g) and aqueous $ClO_2$ (7.1 g/L, 30 mL) is then added and the mixture is again placed in the 70° C. water bath for at least 60 min. The wooden cube is washed with water, kiln dried, and the carboxyl content of the carboxylic acid-functionalized cube measured using standard analytical techniques.

B. Carboxylic Acid Activation. The carboxylic acid-functionalized wooden cube obtained from Example 2A above is added to a solution of thionyl chloride in chloroform (10M). The thionyl chloride solution is used in a sufficient amount to ensure complete conversion of carboxylic acid groups on the wooden cube. Dimethylformamide (several drops) is added and the reaction mixture is heated to reflux in a nitrogen atmosphere for several hours. The mixture is cooled to room temperature and the wooden cube is removed from the solution under a blanket of nitrogen and washed with dry chloroform. The acid chloride-functionalized wooden cube is used directly in the next reaction.

C. Amide-Bond Formation. A 1.5 M solution of (S)-canavanine methyl ester in chloroform is prepared. To this solution is slowly added at least 1 equivalent of triethylamine. The acid chloride-functionalized wooden cube from Example 2B is then added to an excess of the amino ester. The mixture is stirred initially at room temperature, and is heated as necessary until the amidation reaction is complete. The wooden cube is removed from the reaction mixture and washed with chloroform.

Figure 2:
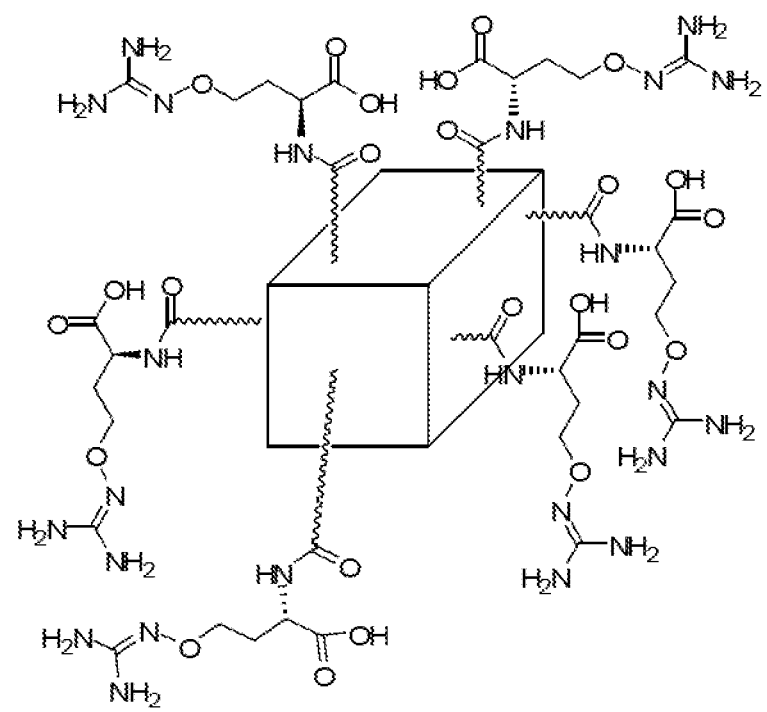
FIG. 2 is a general illustration of a wooden cube, functionalized with (S)-canavanine residues, according to one embodiment.

D. Deprotection. The wooden cube prepared in Example 2C is heated in the presence of aqueous HCl (3M) to hydrolyze the ester functional groups. The wooden cube is removed from the reaction mixture, rinsed with water and dried to provide a treated wooden cube which has been functionalized with S-canavanine, through the N-terminus of the amino acid, as illustrated in FIG. 2. The degree of functionalization is determined via standard analytical techniques.

E. Insect Resistance Testing. The S-canavanine-treated wooden cube from Example 2D is studied for its resistance to attack by insects such as moths (e.g., the Nantucket Pine Tip moth) and beetles. The treated wood sample, along with an untreated control sample, is incubated with the study insect. The wood samples are inspected for decomposition every three days (both visually and by monitoring for mass loss of treated wood samples). After 6 months, the mass of the treated wood sample is expected to remain unchanged (no wood decomposition is observed). In contrast, the untreated control is expected to show a mass decrease of greater than 5%. The time period of insect resistance testing may be increased beyond a year. In general, it is expected to be found that the treated wood samples resist decay by insects over long periods (6 months, 1 year, 5 years, 10 years, 20 years, 30 years, and beyond). The testing procedure may be modified to use various shapes and types of wood materials, and may further include structural testing of the wood samples (e.g., modulus of elasticity (MOE), stiffness, tensile strength, compression, shear, etc.). In general, it is expected that the structural characteristics of the treated wood samples exposed to the study insect will remain unchanged over long periods (e.g., 6 months, 1 year, 5 years, 10 years, 20 years, 30 years, and beyond) in comparison to an untreated wood sample which has been exposed to the study insect.

Example 3

Covalent Modification of a Wood Surface with Other Amino Acids

In an analogous fashion to Example 2, separate wood samples are modified with the following amino acids: L-canaline (an α-amino acid found in the jack bean with potent insecticidal properties against the tobacco hornworm and various moths), (1R,2S)-2-amino-4-methylenecyclopentane-1-carboxylic acid ("BAY 10-8888" or "PLD-118," a cyclic β-amino acid with antifungal properties), and (S)-amino-4-oxo-5-hydroxypentanoic acid ("RI-331," an α-amino acid which preferentially inhibits protein biosynthesis in fungi). These previously reported amino acids may be protected as methyl esters and may be attached wood in the manner described in Example 2C, followed by deprotection as set forth in Example 2D. Wood treated with L-canaline is expected to be up to 100% resistant to various insects including moths for long periods (e.g., 6 months, 1 year, 5 years, 10 years, 20 years, 30 years, and beyond). Wood treated with BAY 10-8888 or RI-331 is expected to exhibit up to 100% resistance to rot and/or general hardwood decay by various fungi species and yeast strains (e.g., 6 months, 1 year, 5 years, 10 years, 20 years, 30 years, and beyond). In all cases, the structural integrity of the treated wood samples exposed to insects, fungi, or yeast is expected to be completely preserved in comparison to untreated controls exposed to the same insects, fungi, or yeast.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A composition comprising:
   an amino acid having an N-terminus or a peptide having an N-terminus on a surface of a lignocellulosic material;
   wherein the N-terminus of the amino acid or the peptide is covalently bound to the lignocellulosic material via an amide bond;
   and wherein the composition is a biocidal agent.

2. The composition of claim 1, wherein the lignocellulosic material comprises wood, plant-derived material, kenaf, grasses, bagasse, cotton, jute, hemp, flax, bamboo, sisal, abaca, and mixtures of any two or more thereof.

3. The composition of claim 1, wherein the lignocellulosic material is wood lumber, wood fiber, wood particles, wood chips, ground wood, wood flour, wood flakes, wood veneers, wood laminates, or saw dust.

4. The composition of claim 1, wherein the biocidal agent is a microbicide, a fungicide, a rodenticide, an herbicide, or an insecticide.

5. The composition of claim 1, wherein the amino acid is (S)-canavanine.

6. The composition of claim 1, wherein fungal growth on the treated lignocellulosic material is reduced by about 10% to about 100% in comparison to an untreated lignocellulosic material.

\* \* \* \* \*

UNITED STATES PATENT AND TRADEMARK OFFICE
CERTIFICATE OF CORRECTION

PATENT NO. : 8,986,399 B2  Page 1 of 1
APPLICATION NO. : 13/319834
DATED : March 24, 2015
INVENTOR(S) : Chen et al.

It is certified that error appears in the above-identified patent and that said Letters Patent is hereby corrected as shown below:

In the Specification

In Column 6, Line 14, delete "hexafluorophoshpate," and insert -- hexafluorophosphate, --, therefor Signed and Sealed this
Twenty-ninth Day of September, 2015

Michelle K. Lee
*Director of the United States Patent and Trademark Office*